United States Patent
Wu et al.

(10) Patent No.: US 7,544,757 B2
(45) Date of Patent: Jun. 9, 2009

(54) ETHYLENE/ALKYL ACRYLATE COPOLYMERS AND COMPOUNDS, VULCANIZATES AND ARTICLES THEREOF

(75) Inventors: Yun-Tai Wu, Bryn Mawr, PA (US); Mark Aaron Stewart, Wilmington, DE (US); Yi Ye, The Woodlands, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 372 days.

(21) Appl. No.: 11/478,952

(22) Filed: Jun. 30, 2006

(65) Prior Publication Data

US 2007/0004854 A1    Jan. 4, 2007

Related U.S. Application Data

(60) Provisional application No. 60/695,282, filed on Jun. 30, 2005.

(51) Int. Cl.
*C08F 220/10* (2006.01)
(52) U.S. Cl. .................. 526/329; 524/556; 525/227; 525/228
(58) Field of Classification Search ............... 524/556; 525/326.1, 227, 228; 526/329
See application file for complete search history.

(56) References Cited

U.S. PATENT DOCUMENTS

| | | | |
|---|---|---|---|
| 3,873,494 A | | 3/1975 | Lewis |
| 3,883,472 A | * | 5/1975 | Greene et al. ............... 524/151 |
| 3,904,588 A | | 9/1975 | Greene |
| 4,275,180 A | | 6/1981 | Clarke |
| 4,599,392 A | * | 7/1986 | McKinney et al. ........ 526/318.6 |
| 5,028,674 A | * | 7/1991 | Hatch et al. .................. 526/216 |
| 5,191,050 A | * | 3/1993 | Hert et al. .................... 526/272 |
| 5,498,669 A | | 3/1996 | Williams |
| 6,136,920 A | | 10/2000 | Hert |
| 6,803,424 B2 | * | 10/2004 | Bendler et al. ............ 525/326.1 |
| 7,439,314 B2 | * | 10/2008 | Johnson et al. ............. 526/161 |
| 2003/0069364 A1 | * | 4/2003 | Paglia et al. .............. 525/329.1 |
| 2005/0020775 A1 | | 1/2005 | Wu et al. |

FOREIGN PATENT DOCUMENTS

| JP | 11-343378 A | 12/1999 |
|---|---|---|
| JP | 2000-44757 A | 2/2000 |
| WO | WO 2005/010059 A | 2/2005 |

OTHER PUBLICATIONS

PCT Partial International Search Report for International Application No. PCT/US2006/026085, dated Nov. 9, 2006.

* cited by examiner

*Primary Examiner*—Bernard Lipman

(57) ABSTRACT

Disclosed are copolymers derived from ethylene and an alkyl acrylate comonomer wherein the copolymer has a number average molecular weight ($M_n$) above 40,000. This invention also provides compounded compositions and cured compositions (i.e., vulcanizates) comprising these copolymers. The copolymers provide improved dynamic fatigue resistance of the vulcanizates. Also disclosed are articles comprising the copolymers, such as tubing, hoses, dampers, seals and gaskets.

16 Claims, No Drawings

ETHYLENE/ALKYL ACRYLATE COPOLYMERS AND COMPOUNDS, VULCANIZATES AND ARTICLES THEREOF

The application claims priority to U.S. provisional application No. 60/695,282, filed Jun. 30, 2005, the entire disclosure of which is incorporated herein by reference.

The invention relates to ethylene copolymers derived from ethylene and alkyl acrylate comonomers and to compounded compositions and vulcanizates or articles comprising these copolymers and compositions.

BACKGROUND

The automotive and transportation industries use elastomeric (rubber-like) materials for a number of parts that require elastic properties such as boots, gaskets, seals, hoses, dampers, etc. A number of synthetic polymeric materials have been provided for these applications.

U.S. Pat. No. 3,873,494 describes vulcanization of ethylene/acrylic ester copolymers in the presence of a peroxide curing system and an antioxidant system that is accelerated by the presence of a butadiene/acrylonitrile polymer. U.S. Pat. No. 4,275,180 describes a polymer composition that comprises a crosslinkable or crosslinked blend of an elastomeric ethylene/alkyl acrylate copolymer and a thermoplastic polymer. U.S. Pat. No. 5,498,669 discloses blends of ethylene/alkyl acrylate dipolymers, neutralized ethylene acid copolymers (ionomers) and organic peroxides, useful for continuous pressureless curing processes.

Trends in the automotive industry require elastomeric materials used in making automotive parts to have wider ranges (both high and low) of service temperature capabilities and good fluid resistance to meet new performance demands. It is also desirable that these elastomers have improved dynamic fatigue resistance, compression set and tensile properties such as tensile elongation-at-break. Such a combination of properties and moderate cost are highly desired.

SUMMARY OF THE INVENTION

The invention provides copolymers, compounded compositions involving these copolymers, and vulcanizates (elastomeric compositions derived from curing/crosslinking the compounded compositions). The copolymers are characterized by higher number average molecular weight and/or narrower molecular weight distribution (polydispersity) than similar previous copolymers. The vulcanizates exhibit improved dynamic fatigue resistance of cured compounds.

This invention provides a composition comprising a copolymer derived from copolymerization of ethylene with from 45 to 75 weight %, or 50 to 70 weight % of an alkyl acrylate such as methyl acrylate; wherein the copolymer has a number average molecular weight ($M_n$) above 40,000, or above 45,000, or above 55,000; and melt index from 2 to 14, or from 2 to 12 g/10 min; and preferably has a $M_n$ from about 40,000 or about 45,000 to about 60,000 or about 65,000 and a polydispersity from about 3 to about 7, preferably from 4 to 6.

This invention also provides compound compositions (i.e., precursors to vulcanizates and herein referred to as compounded compositions or merely compounds) comprising the above copolymers and further comprising or produced from a curing agent and optionally one or more additives including an antioxidant, an internal release agent, a scorch retarder, a plasticizer, an accelerator, or a filler.

This invention also provides the composition described above further comprising or produced from at least one additional polymer including a different ethylene alkyl acrylate copolymer, a polyacrylate copolymer, or combinations thereof.

This invention also provides vulcanizates comprising the above compounded compositions that are cured (for example at elevated temperatures and elevated pressures or in a heated salt bath) for sufficient time to crosslink the copolymers, and optionally post-cured (for example at elevated temperature and ambient pressure) to further cure the vulcanizates.

This invention also provides an article comprising or produced from a composition that is as characterized as above or is the vulcanizate characterized as above wherein the article includes tubing, hoses, dampers, seals, gaskets, ignition wire jacketing, belts, or molded boots such as spark plug boots.

This invention also provides a process comprising contacting ethylene with an alkyl acrylate under a condition effective to produce an ethylene copolymer, wherein the alkyl acrylate comprises about from 45 to 75 weight %, or 50 to 70 weight % of an alkyl acrylate such as methyl acrylate; and the remainder is ethylene; the weight % is based on total weight of ethylene and alkyl acrylate; and the condition includes a temperature from 120° C. to 185° C. or 140° C. to 165° C., a pressure from about 1900 to 2810 kg/cm$^2$ or from 2065 to 2810 kg/cm$^2$, and a feed temperature from 30° C. to 90° C. or from 50° C. to 90° C.

Also provided is the process characterized above further comprising combining the ethylene copolymer with a curing agent, optionally one or more additives, and optionally one or more additional polymers to produce a compounded composition; optionally forming the compounded composition into a desired shape and concurrently or sequentially curing and optionally post curing the compounded composition to produce a vulcanizate; wherein the additive includes an antioxidant, an internal release agent, a scorch retarder, a plasticizer, an accelerator, or a filler, or combinations of two or more thereof; the additional polymer includes ethylene alkyl acrylate copolymer, a polyacrylate copolymer, or combinations thereof; and the article includes tubing, hoses, dampers, seals, gaskets, ignition wire jacketing, belts, or molded boots.

This invention also provides compositions comprising the copolymer described above and further comprising or produced from a second polymer including thermosets such as unsaturated polyester resins or vinyl ester resins subject to further curing; or thermoplastics; optionally further comprising fillers, reinforcing fibers (continuous or noncontinuous, woven or nonwoven) or fibrous structures such as pulps. This invention also provides an article comprising or produced from this composition wherein the article can be made using processes such as coating, laminating, molding, extruding, filament winding, calendering or combinations thereof; and subsequently curing; and the article includes an electrical part such as a distributor cap.

This invention also provides the process characterized above further comprising combining the ethylene copolymer with a curing agent, one or more additional polymers including thermosets such as unsaturated polyester resins or vinyl ester resins subject to further curing or thermoplastics, and optionally one or more additives including filler, reinforcing fiber, fibrous structure of pulps, or combinations of two or more thereof to produce a compounded composition; and fabricating the compounded composition into an article; the article includes electrical parts such as distributor caps, and fabricating includes coating, laminating, molding, extruding, filament winding, calendering, or combinations of two or more thereof and subsequently curing.

DETAILED DESCRIPTION OF THE INVENTION

All references disclosed herein are incorporated by reference.

This invention provides copolymers (dipolymers) comprising ethylene and an alkyl acrylate, having higher number average molecular weight ($M_n$), lower melt index (MI) and/or lower polydispersity than other polymers of the same comonomer proportions. The copolymers can be prepared by carrying out copolymerization at a combination of lower reactor temperature, higher reactor pressure, and higher feed temperature than described in U.S. Pat. Nos. 3,883,472 and 3,904,588. Preferably, the copolymers are random copolymers.

Polydispersity is defined as the weight-average molecular weight divided by the number average molecular weight ($M_w/M_n$ or PD). These molecular weight properties can be determined by using size exclusion chromatography.

"Copolymer" means polymers containing two or more different monomers, "dipolymer" means a copolymer comprising two comonomers and "terpolymer" means a copolymer comprising three comonomers.

The vulcanizates prepared from the copolymers provide improved dynamic flex fatigue resistance, as shown by a DeMattia test at high temperature (e.g. 150° C.). A DeMattia test ascertains the number of times a test sample can be repeatedly bent to produce cracking, leading to total failure. Higher molecular weight copolymers enhance high temperature dynamic fatigue resistance of the vulcanizates. They also allow the use of pressureless curing processes (e.g. heated salt baths).

The copolymers comprise ethylene and an alkyl acrylate. The alkyl acrylate may have up to 10 carbon atoms in the alkyl chains, which can be branched or unbranched. For example, the alkyl group may be selected from methyl, ethyl, n-butyl, 2-ethylhexyl, and other alkyl groups and the alkyl acrylate may be selected from methyl acrylate, ethyl acrylate, n-butyl acrylate, 2-ethylhexyl acrylate, and other alkyl acrylates containing up to 10 carbon atoms in the alkyl groups. Methyl acrylate is a preferred alkyl acrylate.

Ethylene is the other component in the dipolymer. As such, ethylene represents essentially the remainder of the copolymer relative to the required alkyl acrylate; i.e., polymerized ethylene is present in the copolymers in a complementary amount.

Examples of copolymers include copolymers of ethylene and methyl acrylate (MA), copolymers of ethylene and ethyl acrylate, and copolymers of ethylene and n-butyl acrylate. For example, the copolymer comprises methyl acrylate and has a $M_n$ from about 40,000 to about 60,000 or about 65,000, a melt index from 2 to 12 g/10 min, and a polydispersity from about 3 to about 7 or from 4 to 6.

The copolymers can be readily prepared by copolymerizing ethylene and an alkyl acrylate in the presence of a free-radical polymerization initiator including for example peroxygen compounds or azo compounds. The copolymerization may be run by continuously feeding ethylene, the alkyl acrylate, a free radical initiator, and optionally a solvent such as methanol or the like (see for example U.S. Pat. No. 5,028,674) to a stirred autoclave of the type disclosed in U.S. Pat. No. 2,897,183. Alternatively, other high-pressure reactor designs with sufficient mixing, residence time, temperature and pressure control, generally known in the art as autoclaves, operated either alone or in series with or without inter-stage cooling or heating, with multiple compartments and feed zones may be employed. Reactor dimensions such as volume, length and diameter may also influence operating conditions. The rate of conversion may depend on variables such as the polymerization temperature and pressure, monomer feed temperature, monomers employed, concentration of the monomers in the reaction mixture, and residence time for the desired yield and copolymer composition. It may be desirable to adjust the residence time and, in some cases, to use a telogen (chain transfer/chain terminating agent) such as propane to help adjust the molecular weight. The reaction mixture is continuously removed from the autoclave. After the reaction mixture leaves the reaction vessel, the copolymer is separated from the unreacted monomers and solvent (if solvent was used) by, for example, vaporizing the unpolymerized materials and solvent under reduced pressure and at an elevated temperature. The terms "feed temperature" and "monomer feed temperature" refer to the temperature at which the comonomers are controlled prior to their introduction into the reactor.

The copolymerization can be carried out in a pressurized reactor at elevated temperature, from 120° C. to 185° C., or from 140° C. to 165° C., and pressures of from 1900 to 2810 kg/cm$^2$, or from 2065 to 2810 kg/cm$^2$, with feed temperatures from 30° C. to 90° C., or from 50° C. to 90° C.

Appropriate peroxide initiators for the copolymerization process may depend on the reactor operating conditions, such as temperature and pressure, comonomers used, comonomer concentration, and inhibitors that are typically present in commercially available comonomer. The initiator can be employed neat as a liquid, dissolved or diluted in a suitable solvent such as odorless mineral spirits or mixed with another different initiator. Common classes of organic peroxides useful as free radical initiators include dialkyl peroxides, peroxy esters, peroxy dicarbonates, peroxy ketals, and diacyl peroxides. Examples of suitable peroxides include di(3,3,5-trimethyl hexanoyl) peroxide, tert-butyl peroxypivalate, tert-butyl peroxyneodecanoate, di(sec-butyl) peroxydicarbonate, and tert-amyl peroxyneodecanoate or combinations of two or more thereof. These and other suitable peroxides are available under the Luperox® tradename from Arkema or the Trigonox® tradename from Akzo Nobel. Similarly, suitable azo initiators may be used.

After the continuous operation has reached a steady state, the total per-pass conversion of monomers to polymer may vary from 5 to 25 weight percent. The melt index (MI) of a copolymer may be roughly related to its molecular weight; the lower the MI the higher the molecular weight. The MI values are determined at 190° C. as described in ASTM test method D1238-01 (Procedure A, Condition 190/2.16). The copolymers have MI that vary, depending on polymerization conditions or the use of a telogen additive, typically but not limiting from about 3 to about 20 g/10 min. The weight % of the acrylates can be determined by proton nuclear magnetic resonance (NMR) or Fourier-transform infrared (FTIR) analysis, after calibration by NMR.

The composition may contain some unreacted monomer residuals, mainly of alkyl acrylates. Removal of residuals is generally known in the art as a devolatilization or finishing step. For small laboratory scale preparations, devolatilization can be accomplished by heating in a vacuum oven for a period of time (for example, heating to 100° C. with a 635 mm Hg vacuum for 4 hours). For larger-scale preparations, the residuals can be removed by processing through a single or twin-screw extruder with vacuum ports at elevated temperature and the option to use water injection. Optionally, in finishing the copolymer a release agent (such as R2 listed in Table A) may be added at about 0.1 to 1 weight percent in order to improve handling.

In the finishing operation, screw size and design may impact the amount of copolymer that can be processed and in turn impact the selection of the appropriate processing variables, including for example screw speed, residence time and temperature. One skilled in the art can design the appropriate processing variables to achieve a balance among these variables necessary for preparation of suitable finished compositions. Adjusting finishing variables can impact the levels of residual monomers (i.e., free comonomers, measured by gas chromatograph headspace analysis) present in the finished composition.

The finished ethylene copolymers described above are mixed with additional materials (a process known in the art as compounding) to provide a compounded composition that can be cured (a process known in the art as vulcanization) to provide a vulcanizate. The compositions can be compounded and cured according to the following procedures.

Compounding involves combining the finished copolymer with added ingredients such as cure agents, antioxidants, internal release agents, scorch retarders, plasticizers, accelerators, fillers and the like. Preferred and notable compounded compositions comprise the preferred and notable copolymers described above.

Optionally, the copolymers can be combined or blended with ethylene alkyl acrylate copolymers, including ethylene di- and terpolymers as generally known in the art (so-called AEM type materials); for example, an ethylene/methyl acrylate dipolymer or an ethylene/methyl acrylate/acid cure site terpolymer with number average molecular weight of less than 40,000, and the like; as well as in combination with polyacrylate copolymers, as generally known in the art (so-called ACM type materials); for example, ethyl acrylate/butyl acrylate/methoxyethyl acrylate/cure site and the like. Blends with AEM materials (e.g. ethylene/methyl acrylate with lower molecular weight) may provide improved processibility such as green strength, collapse resistance or extrusion speed as well as improved dynamic fatigue resistance. Blends with polyacrylate ACM materials (e.g. ethyl acrylate/butyl acrylate/methoxyethyl acrylate, ethyl acrylate/butyl acrylate/cure site and the like) may provide improved processibility.

The ingredients of the compounds (including the copolymer, cure agents, additives, and/or additional polymers) can be mixed in known equipment such as an internal mixer (e.g., a Banbury mixer), a two-roll mill and other similar mixing devices known in the art to achieve a well-dispersed mixture.

After compounding, the compositions can be vulcanized. Preferred and notable vulcanized compositions comprise the preferred and notable copolymers and compounded compositions described above. A composition comprising the uncrosslinked (unvulcanized) copolymer and a curing agent optionally along with various fillers, other additives and/or polymers is subjected to a curing step at sufficient time, temperature and pressure to achieve covalent chemical bonding (i.e., crosslinking). Vulcanization involves curing the compounded composition at elevated temperature and elevated pressure for sufficient time to crosslink the copolymer (often referred to as press-curing in laboratory preparations), followed by an optional post-cure heating at ambient pressure to further cure the elastomer. For example, the vulcanizate may be formed and cured using known procedures at about 160° C. to about 200° C. for about 2 to 60 minutes. Post-cure heating is conducted at about 160° C. to about 200° C. for one to several hours. Optionally, the compound can be cured with heat, with or without pressure, to form a vulcanizate with either a solid structure or a foam structure.

The compounded compositions can be vulcanized, for example, in the presence of a peroxide curing system composed of peroxide and optionally a coagent. Suitable peroxides and coagents include essentially any such curative system as generally known in the art, including those described herein, operative at the temperature being employed during vulcanization. A preferred peroxide is $\alpha$, $\alpha$-bis (t-butylperoxy)-diisopropylbenzene (available from GEO Specialty Chemicals under the tradename Vul-cup®). About 0.5 to 5 parts by weight of peroxide per 100 parts of polymer (phr) may be employed to vulcanize a composition. For safer handling and mixing, the peroxide may be provided on an inert carrier.

The coagent or accelerator used in peroxide cure can be, for example, N,N'-(m-phenylene) dimaleamide, trimethylolpropane trimethylacrylate, tetraallyloxyethane, triallyl cyanurate, tetramethylene diacrylate, or polyethylene oxide glycol dimethacrylate. The coagents usually contain multiple unsaturated groups such as allyl or acrylic esters. A preferred coagent/accelerator is N,N'-(m-phenylene) dimaleamide, available from DuPont Performance Elastomers as HVA-2. The amount of the coagent is 0 to 5 parts by weight of coagent per 100 parts of polymer, or about 1 to 4 parts by weight per 100 parts of polymer.

The vulcanizates may contain an antioxidant system typically based on, but not limited to a phosphorus ester antioxidant, a hindered phenolic antioxidant, an amine antioxidant, or a mixture of two or more of these compounds. The proportion of the antioxidant compound in the vulcanizing composition is 0.1 to 5 parts by weight per 100 parts of polymer, preferably about 0.5 to 2.5 parts by weight per 100 parts of polymer. The antioxidant improves the air heat aging of the vulcanizate. Below the lower limit of this range, the antioxidant effect may be low. The weight ratio of the phenolic or amine antioxidant to the phosphorus compound in mixtures can be from about 0.5 to 3; preferably about 1.

The phosphorus ester can be for example, tri(mixed mono- and dinonylphenyl) phosphite, tris(3,5-di-t-butyl-4-hydroxyphenyl phosphate, high molecular weight poly(phenolic phosphonates), and 6-(3,5-di-t-butyl-4-hydroxy)benzyl-6H-dibenz-[c,c][1,2]oxaphosphorin-6-oxide, or combinations of two or more thereof.

Suitable hindered phenolic antioxidants can be, for example, 4,4'-butylidenebis(6-t-butyl-m-cresol), 1,3,5-trimethyl-2,4,6-tris-(3,5-di-t-butyl-4-hydroxybenzyl)benzene, 2,6-di-t-butyl-$\alpha$-dimethylamino-p-cresol and 4,4'-thiobis-(3-methyl-6-t-butylphenol), or combinations of two or more thereof.

Amine antioxidants include, for example, polymerized 2,2,4-trimethyl-1,2-dehydroquinoline; N-phenyl-N'-(p-toluenesulfonyl)-p-phenylenediamine, N,N'-di($\beta$-naphthyl)-p-phenylenediamine and 4,4'-bis($\alpha$,$\alpha$-dimethylbenzyl) diphenylamine, or combinations of two or more thereof.

Antioxidant compositions can contain tri(mixed mono-and dinonylphenyl) phosphite mixed with either 4,4'-butylidenebis(6-t-butyl-m-cresol) or 4,4'-bis($\alpha$,$\alpha$-dimethylbenzyl)diphenylamine. Particularly preferred antioxidant compositions contain 4,4'-bis($\alpha$,$\alpha$-dimethylbenzyl)-diphenylamine (available commercially as Naugard® 445 from Chemtura).

Fillers can be used to reduce cost and to improve mechanical properties. A vulcanized composition may contain from 25 to 60 or 70 volume percent of fillers, alternatively from 30 to 120 or 150 parts of filler per hundred parts of polymer. Suitable fillers include, for example but not by way of limitation, carbon black, calcium carbonate, magnesium silicate or silica, notably carbon black. The preferred proportion can depend on the reinforcing effect of the filler used, which can be influenced by factors such as particle size of the filler.

A higher molecular weight copolymer can also be used in blends with existing copolymers derived from copolymerization of ethylene with one or more alkyl acrylates optionally incorporating an acid cure site (e.g. ethylene/methyl acrylate/acid cure site) as well as with polyacrylates (e.g. ethyl acrylate/butyl acrylate/methoxyethyl acrylate, ethyl acrylate/butyl acrylate/cure site and the like) for applications such as tubing, hoses, dampers, and seals for improved dynamic fatigue resistance and processability.

Once cross-linked, the compositions described herein are not thermoplastic, per se, so articles may be prepared by forming the compound into the desired shape by molding or extrusion procedures and concurrently or subsequently curing the compound, with or without additional pressure.

The vulcanizates can be used in a wide variety of automotive and nonautomotive articles, including tubing, hoses, dampers, seals, gaskets, ignition wire jacketing, belts, and miscellaneous molded boots such as spark plug boots. Tubing includes but is not limited to crank case vent tubing, diesel particle filter tubing and engine management tubing. Hoses include but are not limited to turbocharger hoses, turbo diesel air cooler hoses, transmission oil cooler hoses, power steering hoses (low pressure), air conditioning hoses, air ducts, fuel line covers, and vent hoses. The vulcanizates are also useful for crankshaft torsional dampers and for noise management parts such as grommets.

The articles can be prepared by compounding the copolymer with added ingredients such as antioxidants, internal release agents, scorch retarders, plasticizers, cure agents, accelerators, fillers and the like and forming the composition into the desired shape by, for example, injection molding, compression molding or transfer molding. The compositions are held in the molds at elevated temperature and pressure for a period of time to initiate crosslinking (curing) and the shaped compositions are then removed from the molds and optionally heated at ambient pressure (post-curing) to continue the curing.

In some cases such as tubing or hoses, the compounded composition as described above can be formed into a shaped article by extrusion through an appropriately designed die. The initially-shaped article can be further shaped by forming with a mandrel while still pliable prior to curing. Hoses and tubing can be cured by treatment with super heated steam, hot air or hot inert gases such as nitrogen to provide the necessary heat and pressure. Straight tubing can be cured in a heated salt bath at ambient pressure.

Some articles may comprise elements in addition to the compositions as described herein. For example, articles (e.g. seals) may be prepared in which the composition of this invention is molded around a metal or plastic element. Other articles (e.g. hoses) can be extruded with reinforcing fibers, fiber structures or cording incorporated therein.

Although the copolymers are discussed primarily in terms of their use in compositions capable of forming elastomeric vulcanizates, they may, in addition to the copolymers, further comprise or be produced from a second polymer including thermosets such as unsaturated polyester resins or vinyl ester resins subject to further curing; or thermoplastics; optionally further comprising fillers, reinforcing fibers or fibrous structures such as pulps. Reinforcing fibers can be continuous or noncontinuous, woven or nonwoven. The fibers may be made of glass, carbon (graphite), para-aramids, metal or mineral. Curing processes include, for example but not limited to, use of peroxide-based systems, with application of heat and optionally pressure.

The copolymers provide, for example but not limited to, toughening for polyamide compositions (for example, at less than 30 weight % of copolymer in the polyamide composition). Polyamides include those known in the art. Polyamides generally can be prepared from lactams or amino acids (e.g. nylon-6 or nylon-11), or prepared from condensation of diamines such as hexamethylenediamine with dibasic acids such as succinic, adipic, or sebacic acid. Copolymers and terpolymers of these polyamides are also included. Polyamides include polyepsiloncaprolactam (nylon-6), polyhexamethylene adipamide (nylon-66), nylon-11, nylon-12, nylon-12,12 and copolymers and terpolymers such as nylon-6/66, nylon-6/10, nylon-6/12, nylon-66/12, nylon-6/66/610 and nylon-6/6T, or combinations of two or more thereof. Notable polyamides are polyepsiloncaprolactam (nylon-6), polyhexamethylene adipamide (nylon-66), particularly nylon-6, or combinations thereof. In addition to the polyamides described above, other polyamides such as amorphous polyamides may also be used.

An article comprising or produced from compositions comprising the copolymer and further comprising at least one additional polymer (e.g. thermosets) can be made from processes such as coating, laminating, molding, extruding, filament winding, calendering or combinations thereof; and subsequently curing. Examples of such articles include electrical parts including distributor caps and other articles fabricated from toughened thermosets.

While the invention has been particularly shown and described with reference to certain embodiments thereof, it may be understood by those skilled in the art that various changes in form and details may be made without departing from the spirit and scope of the invention. The following Examples are merely illustrative, and are not to be construed as limiting the scope of the invention described and/or claimed herein.

EXAMPLES

For example, a copolymer of this invention was produced in a high pressure pilot-scale autoclave reactor at a reactor temperature of 145° C. and a pressure of 2110 kg/cm$^2$ (207 MPa) with an ethylene feed rate of 11.34 kg/h, a methyl acrylate feed rate of 1.82 kg/h, a methanol solvent feed rate of 450 g/h, and a propane telogen feed rate of 1.29 kg/h at a feed temperature of 70° C. Di(sec-butyl) peroxydicarbonate (Luperox® 225 from Arkema) initiator was used, diluted to 4 volume % in odorless mineral spirits. This process provided a copolymer at a rate of 1.36 kg/h. The resulting copolymer had 69.2 weight % of methyl acrylate with a melt index of 11.8 g/10 minutes and a polydispersity of 3.84, having a $M_n$ of 49,800.

Additional Examples were prepared similarly, with reaction parameters summarized in the following Tables. Amounts of comonomers in the final copolymer are indicated in weight percent, unless indicated otherwise.

The molecular weights of the copolymers were determined by using the size exclusion chromatography (also known as GPC, Gel Permeation Chromatography) technique common to the field. An integrated multi-detector size exclusion chromatography system, such as GPCV 2000™ from Waters Corporation (Milford, Mass.) was used. It is capable of keeping a constant temperature across the entire path of a polymer solution from the injector through detectors. Two differential on-line detectors were used in series: a refractive index detector and a capillary viscometer detector. There were four 8mm×300 mm styrene-divinyl benzene columns in the system, for separation: two linear GPC KF806M, one GPC KF802 and one GPC KF-801, all from Shodex (Japan). The mobile phase was tetrahydrofuran stabilized with 0.05% butylated hydroxytoluene, (J. T. Baker, Phillipsburg, N.J.). The columns were calibrated with a set of 10 narrow polydispersity (<1.1) polystyrene (PS) standards with peak molecular weights from 580 through 7,500,000 (Polymer Laboratories). Test samples were prepared by dissolving the polymer in mobile phase solvent at 40° C. with continuous moderate agitation without filtration, (automatic sample preparation system PL 260™ from Polymer Laboratories, Church Stretton, UK). The sample was injected into the column and data collected. The operating conditions were: temperature, 40° C.; flow rate, 1.0 ml/min; injection volume, 0.219 ml; run time, 90 minutes. The data were analyzed with the software Empower™ 1.0 Chromatography Data Manager from Waters.

The copolymers were compounded with additional components including cure agents, accelerators, fillers, release aids, and antioxidants (see Table A below) according to the following general procedure.

The respective starting ingredients were mixed on a B or OOC size Banbury-type internal mixer using an upside-down mixing procedure and a dump temperature of 105° C. followed by further mixing on a two-roll mill at about 25° C. to achieve a homogeneous mixture. Amounts of components in the Tables hereafter are provided in parts per hundred (phr) of polymer.

TABLE A

| | Material | Trade Name | Supplier |
|---|---|---|---|
| Release Aids | | | |
| R1 | Octadecyl Amine | Armeen ® 18D | Akzo Nobel |
| R2 | Complex Organic Phosphate Ester | Vanfre ® VAM | R. T. Vanderbilt |
| R3 | Stearic Acid | | |
| Anti-oxidants | | | |
| A1 | 4,4'-bis(α,α-dimethylbenzyl)-diphenylamine | Naugard ® 445 | Chemtura |
| Filler | | | |
| F1 | Carbon Black (FEF N-550) | | |
| Curative System | | | |
| CA1 | α,α-bis(t-butylperoxy)-diisopropylbenzene | Vul-cup ® 40KE | GEO Specialty Chemicals |
| CA2 | N,N'-(m-phenylene) dimaleamide | HVA-2 | DuPont Performance Elastomers |

Vulcanized slabs of 1.9 mm nominal thickness were prepared by curing the compounded composition for 5 to 10 minutes at 180° C. at a pressure of about 43.2 kg/cm$^2$ (4240 kPa) and then post-cured at 175° C. for one hour at ambient pressure. Slabs at 3 mm nominal thickness were prepared similarly. Samples for the DeMattia testing were prepared by molding the compounded composition into test coupons for 5 to 10 minutes at 180° C. at a pressure of about 43.2 kg/cm$^2$ (4240 kPa), followed by post-cure heating at 175° C. for one hour.

Compression set testing was conducted according to ASTM D395-02. Mooney viscosity and Mooney scorch testing were conducted according to ASTM D1646-03. MDR testing was conducted according to ASTM D5289-95 (reapproved 2001). DeMattia testing was conducted according to ASTM D430-95 Type 2 (reapproved 2000).

The following Examples illustrate materials comprising ethylene copolymers derived from ethylene and methyl acrylate, having from 60 to 70 weight % methyl acrylate.

In Table 1, the Examples illustrate that lower reactor temperature, higher pressure and higher feed temperature were factors in raising molecular weight and lowering polydispersity compared to Comparative Example C1.

TABLE 1

| | Copolymer | | |
|---|---|---|---|
| Reaction Conditions | C1 | 2 | 3 |
| Pressure (kg/cm$^2$) | 2110 | 2180 | 2110 |
| Reactor Temperature (° C.) | 165 | 145 | 145 |
| Feed Temperature (° C.) | 40 | 50 | 70 |
| MA level | 62.8 | 62.8 | 69.2 |
| Melt Index | 15.2 | 7.3 | 11.8 |
| M$_n$ divided by 1000 | 32.8 | 43.8 | 49.8 |
| Mw divided by 1000 | 185.8 | 173.8 | 191.1 |
| Polydispersity | 5.66 | 3.97 | 3.84 |

TABLE 1-continued

| Compound | C101 | 102 | 103 |
|---|---|---|---|
| Compounded Composition | | | |
| Copolymer | C1 | 2 | 3 |
| Amount of Copolymer, phr | 100 | 100 | 100 |
| A1 | 1 | 1 | 1 |
| R2 | 1 | 1 | 1 |
| R3 | 0.5 | 0.5 | 0.5 |
| R1 | 0.5 | 0.5 | 0.5 |
| F1 | 50 | 50 | 50 |
| CA1 | 5 | 5 | 5 |
| CA2 | 2 | 2 | 2 |
| Total phr | 160.0 | 160.0 | 160.0 |
| Stock Properties | | | |
| MOONEY VISCOSITY, ML(1 + 4) at 100° C. | 37.7 | 39.6 | 31.8 |
| MOONEY SCORCH, MS at 121° C. | | | |
| Minimum, mu | 11.7 | 11.5 | 8.5 |
| t(3), min | >20 | >20 | >20 |
| MDR at 180° C. 0.5 ARC, 20 MIN. | | | |
| ML, dNm | 0.44 | 0.55 | 0.49 |
| MH, dNm | 11.71 | 13.64 | 10.01 |
| ts2, min | 0.77 | 0.69 | 0.77 |
| t(50), min | 1.36 | 1.22 | 1.22 |
| t(90), min | 4.22 | 3.82 | 3.89 |
| Vulcanizate Properties | | | |
| Vulcanizate | C111 | 112 | 113 |
| Compound | C101 | 102 | 103 |
| 1) COMPRESSION SET, METHOD B, PLIED PELLETS | | | |
| After 70 hrs. at 150° C. | 22.1 | 20.4 | 21.1 |
| 2) STRESS-STRAIN AND HARDNESS, ORIGINAL AT 23° C. | | | |
| Hardness, Shore A, points | 69.0 | 68.2 | 70.6 |
| M, 50%, MPa | 2.2 | 2.2 | 2.3 |
| M, 100%, MPa | 5.1 | 5.0 | 4.9 |
| Tb, MPa | 14.6 | 16.4 | 15.9 |
| Eb, % | 257 | 280 | 304 |
| Tear, Die C, kN/m | 28.2 | 30.5 | 30.3 |

Table 2 illustrates DeMattia testing of vulcanizates from Table 1. The results indicate that greater than 7-fold increase in dynamic fatigue resistance under this testing condition can be achieved.

TABLE 2

DeMattia Fatigue Resistance at 150° C.

| Vulcanizate | C111 | 112 | 113 |
|---|---|---|---|
| Cycles to total failure (median of 6 samples) | 10 | 75 | 155 |

Having thus described and exemplified the invention with a certain degree of particularity, the following claims are not to be so limited but are to be afforded a scope commensurate with the wording of each element of the claim and equivalents thereof.

The invention claimed is:

1. A composition comprising a copolymer derived from copolymerization of ethylene with from 45 to 75 weight % of an alkyl acrylate wherein the copolymer has a number average molecular weight ($M_n$) above about 40,000 and a melt index of from 2 to 14 g/10 min.

2. The composition of claim 1 further comprising a curing agent, one or more additives, or combinations thereof wherein the additive includes an antioxidant, an internal release agent, a scorch retarder, a plasticizer, an accelerator, or a filler and the composition is optionally a cured or post-cured composition.

3. The composition of claim 1 further comprising at least one additional polymer, a curing agent, an additive, or combinations of two or more thereof wherein the additional polymer includes an ethylene alkyl acrylate copolymer, a polyacrylate copolymer, or combinations thereof the additive includes an antioxidant, an internal release agent, a scorch retarder, a plasticizer, an accelerator, or a filler and optionally the composition is a cured or post-cured composition.

4. The composition of claim 1 comprising a curing agent, a second polymer, and optionally an additive and optionally the composition is a cured composition wherein the second polymer includes a thermoset, thermoplastic, or combinations thereof the thermoset includes unsaturated polyester resin, vinyl ester resin, or combinations thereof and the additive includes filler, reinforcing fiber, fibrous structure, or combinations of two or more thereof.

5. The composition of claim 1 wherein the copolymer comprises methyl acrylate and $M_n$ from about 40,000 to about 65,000, has a melt index from 2 to 12 g/10 min, and has a polydispersity from about 3 to about 7.

6. The composition of claim 5 wherein the copolymer has a polydispersity from 4 to 6.

7. The composition of claim 5 further comprising a curing agent, an additive, and optionally an additional polymer wherein the additive includes an antioxidant, an internal release agent, a scorch retarder, a plasticizer, an accelerator, or a filler; the additional polymer includes an ethylene alkyl acrylate copolymer, a polyacrylate copolymer, or combinations thereof and the composition is optionally a cured or post-cured composition.

8. The composition of claim 5 further comprising a curing agent, a second polymer, and optionally an additive; and optionally the composition is a cured composition wherein the second polymer includes a thermoset, a thermoplastic, or combinations thereof; the thermoset includes unsaturated polyester resin, vinyl ester resin, or combinations thereof; and the additive includes filler, reinforcing fiber, fibrous structure, or combinations of two or more thereof.

9. An article comprising a composition which comprises or is produced from
an ethylene copolymer, a curing agent, an additive, and optionally an additional polymer wherein the ethylene copolymer is as recited in claim 1; the additive includes an antioxidant, an internal release agent, a scorch retarder, a plasticizer, an accelerator, a filler, or combinations of two or more thereof; the additional polymer includes an ethylene alkyl acrylate copolymer, a polyacrylate copolymer, or combinations thereof and the article includes constant velocity joint boots, I-shaft boots, half-shaft boots, spark plug boots, hoses, seals, gaskets, dampers, belts, or ignition wire jacketing; or
an ethylene copolymer, a curing agent, a second polymer, and optionally an additive wherein the ethylene copolymer is as recited in claim 1; the second polymer includes a thermoset, a thermoplastic, or combinations thereof the thermoset includes unsaturated polyester resin, vinyl ester resin, or combinations thereof; the additive includes filler, reinforcing fiber, fibrous structure, or combinations of two or more thereof; and the article includes printed circuit board, brake pad, or clutch facing.

10. The article of claim 9 wherein the ethylene copolymer is an ethylene methyl acrylate copolymer, has an M hd n from about 40,000 to about 65,000, has a melt index from 2 to 12 g/10 min, and has a polydispersity from about 3 to about 7.

11. A process comprising contacting ethylene with an alkyl acrylate under a condition effective to produce an ethylene copolymer wherein the ethylene copolymer is as recited in claim 1 and the condition includes a temperature from 120° C. to 185° C., a pressure from about 1900 to 2810 kg/cm$^2$, and a feed temperature from 30° C. to 90° C.

12. The process of claim 11 wherein the ethylene copolymer is an ethylene methyl acrylate copolymer, has an $M_n$ from about 40,000 to about 65,000, has a melt index from 2 to 12 g/10 min, and has a polydispersity from about 3 to about 7; the temperature is from 140° C. to 165° C.; the pressure is from 2065 to 2810 kg/cm$^2$; and the feed temperature is from 50° C. to 90° C.

13. The process of claim 11 further comprising combining the ethylene copolymer with a curing agent, an additive, or an additional polymer, or combinations of two or more thereof to produce a compounded composition; optionally forming the compounded composition into a desired shape and concurrently or sequentially curing and optionally post curing the compounded composition; wherein the additive includes an antioxidant, an internal release agent, a scorch retarder, a plasticizer, an accelerator, or a filler, or combinations of two or more thereof the additional polymer includes ethylene alkyl acrylate copolymer, a polyacrylate copolymer, or combinations thereof and the article includes tubing, hoses, dampers, seals, gaskets, ignition wire jacketing, belts, or molded boots.

14. The process of claim 13 wherein the ethylene copolymer is an ethylene methyl acrylate copolymer, has an $M_n$ from about 40,000 to about 65,000, has a melt index from 2 to 12 g/10 min, and has a polydispersity from about 3 to about 7; the temperature is from 140° C. to 165° C.; the pressure is from 2065 to 2810 kg/cm$^2$; and the feed temperature is from 50° C. to 90° C.

15. The process of claim 11 further comprising combining the ethylene copolymer with a curing agent, an additional polymer, or an additive, or combinations of two or more thereof to produce a composition; fabricating the composition into an article; and subsequently curing the article wherein the additional polymer includes thermoset, thermoplastic, or combinations of two or more thereof; the thermoset includes unsaturated polyester resin, vinyl ester resin, or combinations thereof; the additive includes filler, reinforcing fiber, fibrous structure, or combinations of two or more thereof; the article includes electrical parts; and the fabricating includes coating, laminating, molding, extruding, filament winding, calendering, or combinations of two or more thereof.

16. The process of claim 15 wherein the ethylene copolymer is an ethylene methyl acrylate copolymer, has an $M_n$ from about 40,000 to about 65,000, has a melt index from 2 to 12 g/10 min, and has a polydispersity from about 3 to about 7; the temperature is from 140° C. to 165° C.; the pressure is from 2065 to 2810 kg/cm$^2$; and the feed temperature is from 50°C. to 90° C.

* * * * *

UNITED STATES PATENT AND TRADEMARK OFFICE
CERTIFICATE OF CORRECTION

PATENT NO. : 7,544,757 B2  Page 1 of 1
APPLICATION NO. : 11/478952
DATED : June 9, 2009
INVENTOR(S) : Yun-Tai Wu, Mark Aaron Stewart and Yi Ye It is certified that error appears in the above-identified patent and that said Letters Patent is hereby corrected as shown below:

Claim 10, Column 13, Line 2 – delete "M hd n" and replace with "$M_n$"

Signed and Sealed this

First Day of June, 2010

David J. Kappos
*Director of the United States Patent and Trademark Office*